July 6, 1937.  T. H. SCHOEPF ET AL  2,086,176
MAGNETIC BRAKE
Filed Dec. 22, 1934  6 Sheets-Sheet 5

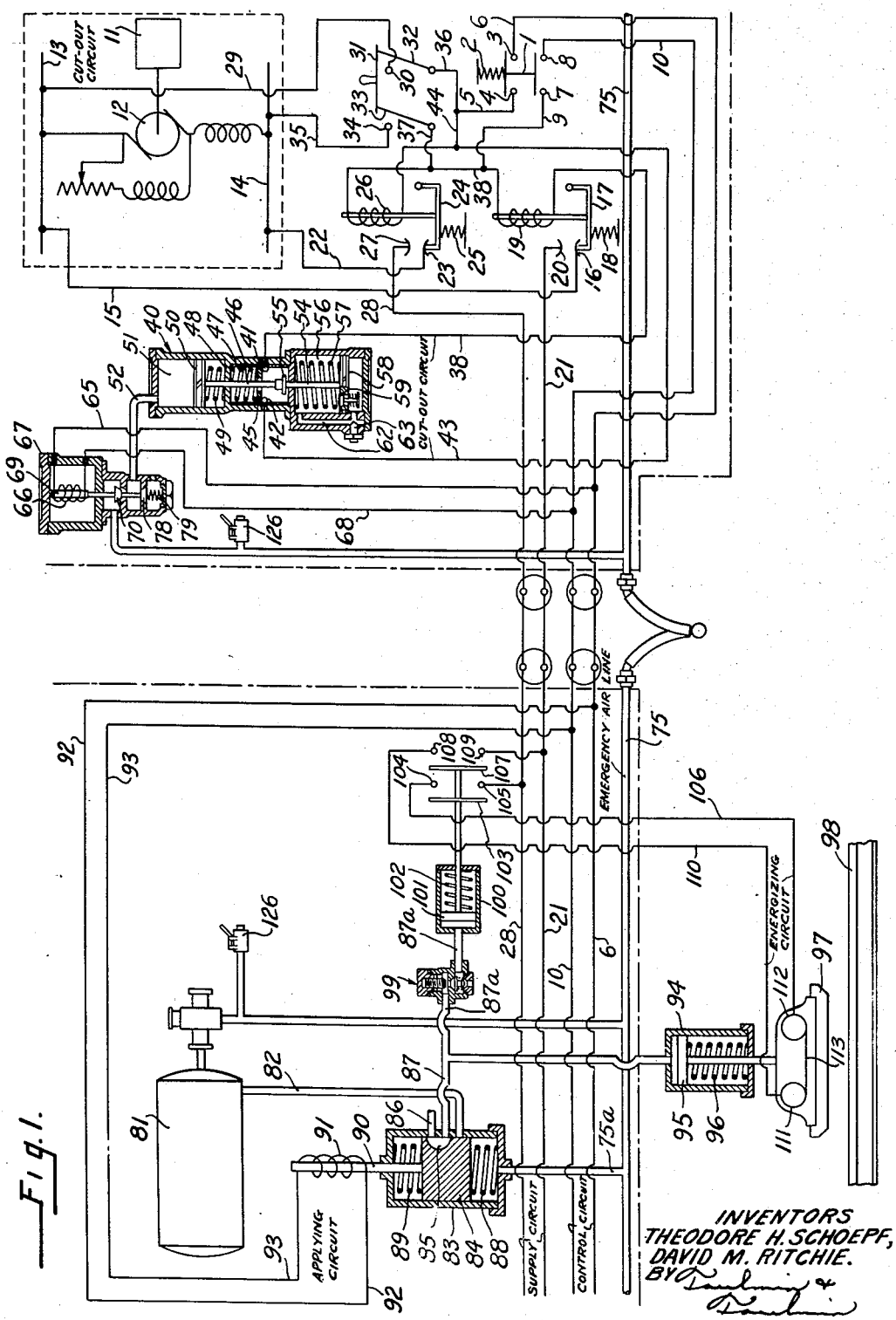

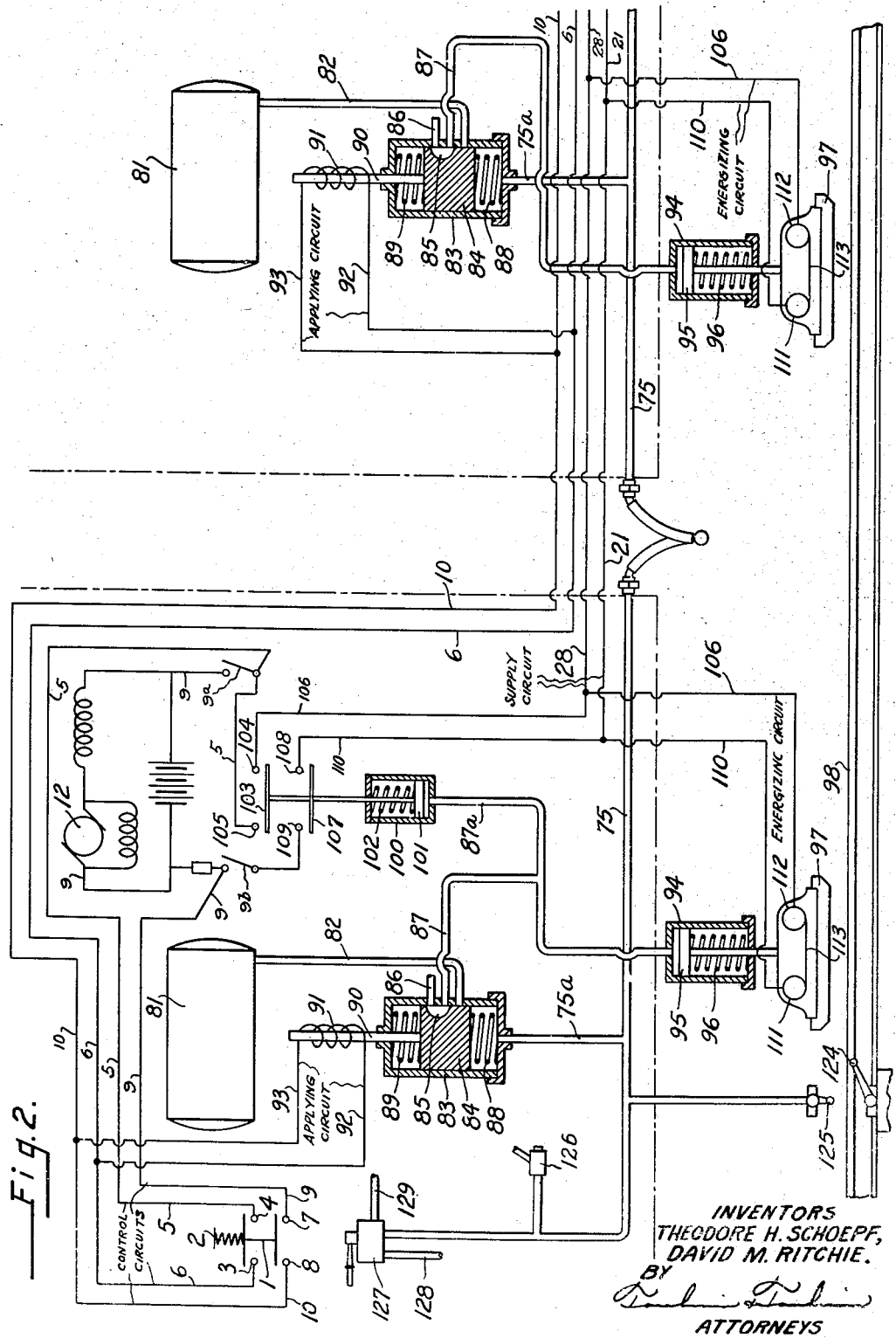

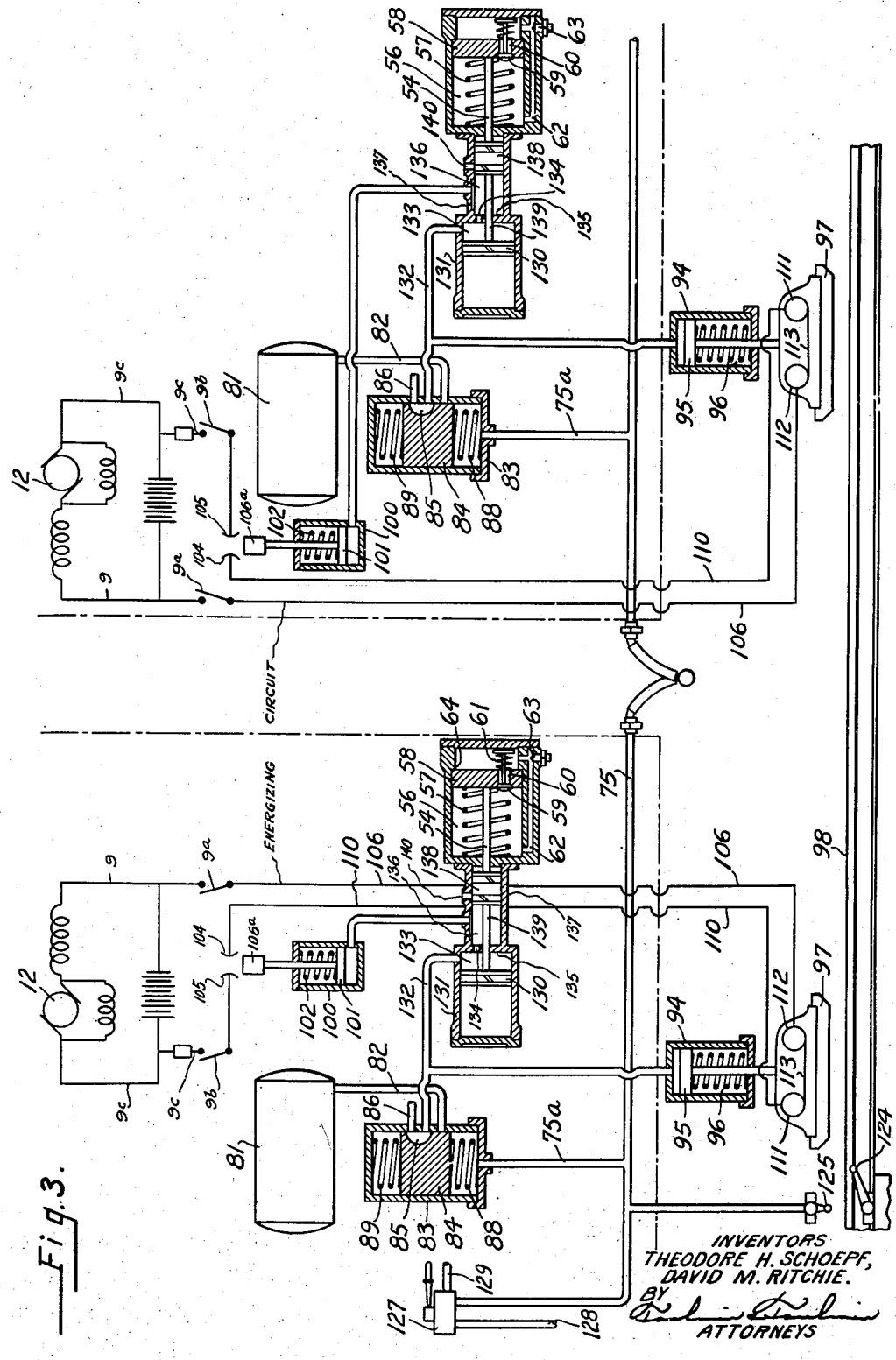

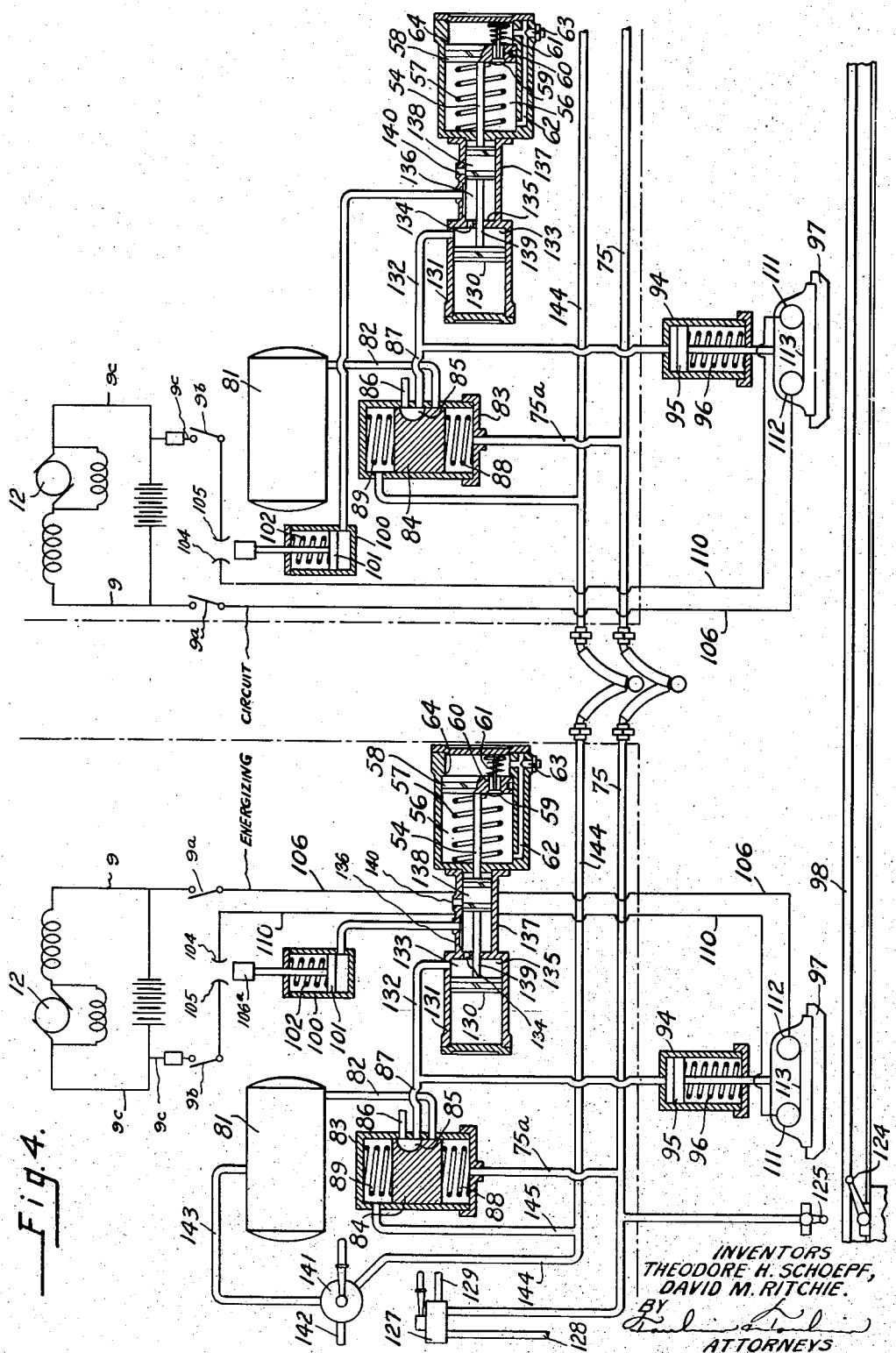

INVENTORS
THEODORE H. SCHOEPF,
DAVID M. RITCHIE.
BY
ATTORNEYS

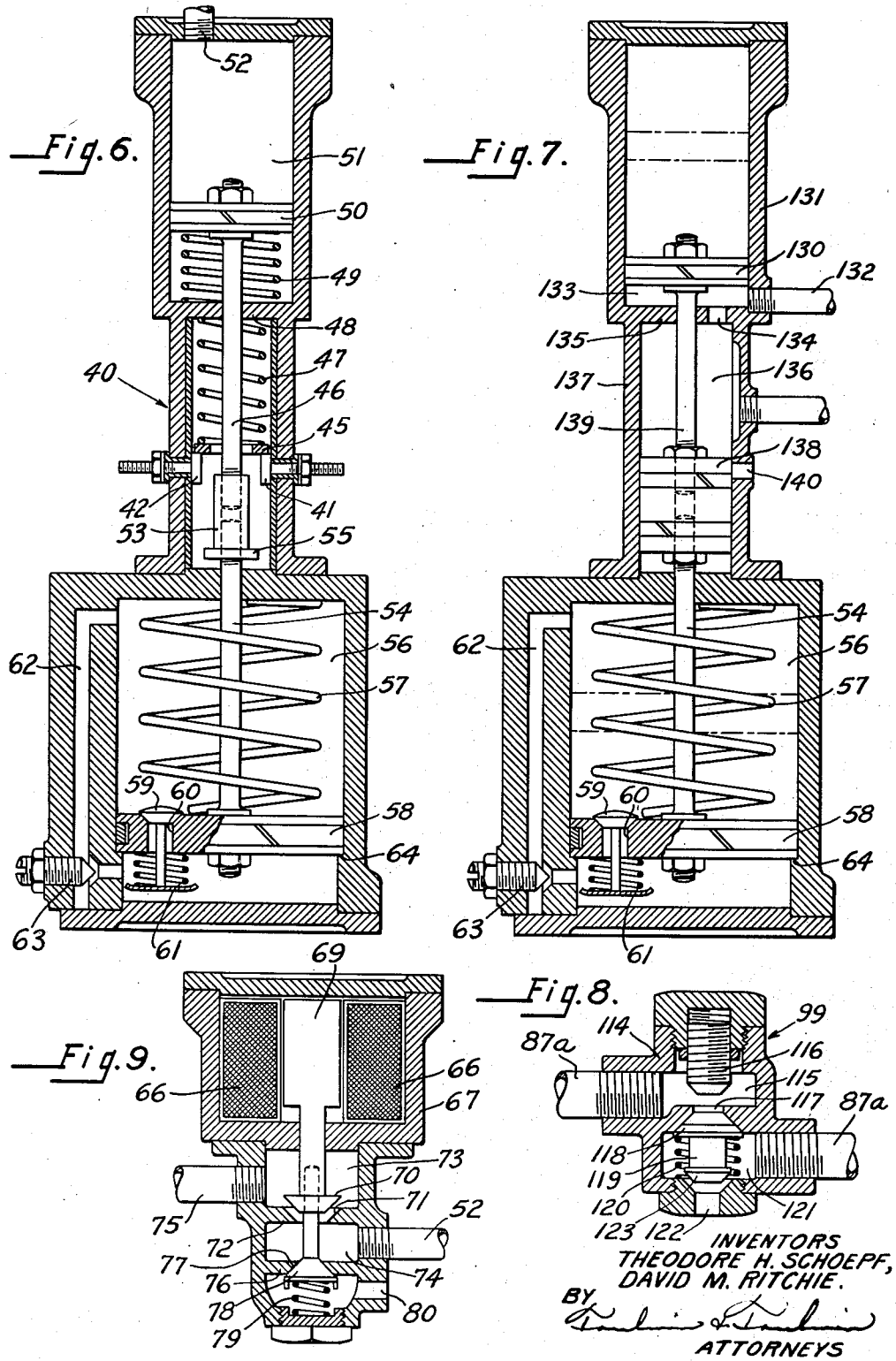

Patented July 6, 1937

2,086,176

UNITED STATES PATENT OFFICE 2,086,176

MAGNETIC BRAKE

Theodore H. Schoepf and David M. Ritchie, Cincinnati, Ohio, assignors to The Cincinnati Traction Building Company, Cincinnati, Ohio, a corporation of Ohio Application December 22, 1934, Serial No. 758,788

28 Claims. (Cl. 303—3)

Our invention relates to magnetic track brakes, an apparatus for applying such brakes, and a method of operation of the braking system.

It is an object of this invention to provide a control operable at the will of the operator, by which the brakes can be applied and energized through the closing of an electric circuit.

It is a further object to provide means in conjunction with the electric circuit for opening the circuit after a predetermined period of the application and energization of the brakes, which will bring about the de-energization.

It is a further object to provide an air system so arranged that a decrease of pressure therein by the opening of a conductor's valve or some other agency will bring about the application of the brakes and their energization.

It is a further object to provide an air system for applying the brakes and energizing them and so arranging the track brakes that they are first moved into the magnetic zone adjacent to the rail or in engagement with the rail, and then energized.

It is a further object to provide a common emergency air system, a common electrical system and a common emergency air-applying valve and a common deenergizing switch with a common source of electrical supply for a plurality of cars, each of which cars is equipped with a magnetic brake applying and energizing switch mechanism, supplied with either independent source of actuating air or a common source of actuating air.

Referring to the drawings:

Figure 1 is a diagrammatic view of the electrical pneumatic and brake systems of a car having the control equipment and an attached car having its allotted equipment for application of its brakes;

Figure 2 is a similar view showing a modified form of apparatus;

Figure 3 is a view showing the automatic control of the emergency air line, delay valves on each car and independent electrical sources and air sources for the actuation and magnetization of the brakes on each car;

Figure 4 is a similar view to that in Figure 3, showing in addition a common control for the application of the brakes through a supplementary air source, such as straight air, in place of the control from the cab or forward car by a common electric circuit, such as shown in Figure 1;

Figure 5 is a view showing the cab having the air control for emergency air, a common electrical control controlling independent electric power sources for magnetizing the brakes mounted on each car and independent air supplies for actuating the rail brakes and closing the magnetizing circuits mounted on each car, such independent air source switches being magnetically controlled from the common controller on a common electric line in the cab or leading car;

Figure 6 is a section showing in detail a time cut-out switch associated with the dashpot for regulating the time application and energization of the rail brake;

Figure 7 is a modified form showing this arrangement employing a pneumatic circuit;

Figure 8 is a section through a valve for regulating the application of the air for applying the rail brake and for closing the energizing switch so that the application will take place first to bring the brake either in the magnetic zone or against the rail for energization;

Figure 9 is a section through the release exhaust magnet valve for use in connection with the emergency air system and with the common electric control circuit.

Referring to the drawings in detail, in particular to Figure 1 as illustrative of a preferred form of the entire system embodying many of the features of this invention, 1 is a push button switch in the cab of the train. It is normally held open by the spring 2. It is adapted to bridge the terminals 3 and 4 of the lines 5 and 6, and the terminals 7 and 8 of the lines 9 and 10. The lines 6 and 10 extend from car to car throughout the train.

Located in the forward car, carrying the cab or some other central station, is a prime mover 11 connected to a generator 12, which in turn is connected to the bus lines 13 and 14. The bus line 13 is connected by the wire 15 to the contact 16 of the solenoid switch 17, normally held open by the spring 18. With the first energization of the solenoid coil 19, the contact 16 will engage the contact 20 of the wire 21 which runs throughout the train. The bus bar 14 is connected to a wire 22 which terminates in the terminal 23 carried by the solenoid switch 24, normally held open by the spring 25 and closed by the energization of the solenoid 26. This results, upon energization, in closing the contacts 23 and 27, which latter contact is in the line 28. This line 28 runs throughout the train in association with the line 21.

These solenoid switches have their solenoids 19 and 26 actuated for closing purposes as follows: the line 29 is connected to the terminal 30 of the two-pole switch 31, having the knife blades 32 and 33. The blade 32 is adapted to engage the terminal 30 while the blade 33 engages the terminal 34 connected to the line 35 which is in turn connected to the bus line 14. The blade 32 is connected by the wire 36 to the line 5. The blade 33 is connected by the line 37 to the line 9 through the wire 38. The wire 38 is connected into the solenoid coils 19 and 26. This wire 38 terminates in the electric cut-out switch, generally designated 40 at the terminal 41. The other side of this switch starts at the terminal 42 and is connected to the line 43, which is connected to the other side of the solenoid coils 19 and 26. It is also connected by the wire 44 at the line 5. The plate 45 serves to bridge the gap between the terminals 41 and 42, so as to complete the circuit. The stem 46 in this delay switch 40 has a spring 47 interposed between the contact plate 45 and the transverse wall 48. On top of the wall 48 is another spring 49 surrounding the stem 46 and engaging with the underside of the piston 50 operating in the air chamber 51, pressure in which is controlled by the air passing through the pipe 52.

Returning to the stem again, it will be noted that it is connected by a sleeve 53 to another stem 54. It carries a shoulder 55 which is adapted to engage with the contact disk 45 and break the electrical circuit between the terminals 41 and 42.

This second stem 54 extends into a dashpot chamber 56, in which is located a spring 57 engaging with the top of the chamber and with the top of the piston 58. The piston 58 has a release valve 59 controlling a port 60 in the piston and held normally closed by the spring 61. The dashpot is provided with a by-pass 62 communicating with the area above and below the piston 58. The flow through this by-pass is regulated by the set screw 63. The downward movement of the piston 58 under the influence of the spring 57 is controlled by the shoulder 64.

Turning again to the electric circuits, it will be noted that the wire 65 is connected to a solenoid 66 of the solenoid air valve 67. The other side of the solenoid is connected to the wire 68, which in turn is connected into the wire 10, while the wire 65 is connected into the wire 6. Upon the energization of this solenoid, its core is actuated and depressed, the core and stem being designated 69. In doing so, the valve 70 is depressed, closing the port 71 in the partition 72 which separates the chamber 73 from the chamber 74. The chamber 74 has the air line 52 which communicates with the switch valve 40, while the chamber 73 is connected into the emergency air line 75, which extends from car to car. The chamber 74 has a bottom 76; the port 77 is controlled by the valve 78 connected to the stem 69. This valve with its stem is pressed upwardly by the spring 79. The opening of the valve 78 permits the air to exhaust through the exhaust port 80.

*Application and energization mechanism for the magnetic brakes*

On each car there is provided an air supply either from its own reservoir 81 or from a common supply. This air supply is connected by a pipe 82 to the valve casing 83 which contains a valve member 84 with a cut-out port 85 on one side thereof, which is just deep enough to span either the exhaust 86 and the brake-actuating pipe 87 or the pipe 87 and the supply pipe 82. A spring 88 is provided below the valve 84 and a spring 89 above the valve. This valve is provided with a valve stem 90, which constitutes the core of a solenoid coil 91 that is connected by the wires 92 and 93 into the lines 10 and 6 respectively.

When the air line 82 and the valve 84 are arranged with one another so as to permit the supply of air to the pipe 87, the air flows into the cylinder 94, pressing the piston 95 downwardly against the spring 96 and thereby bringing the rail brake shoe 97 into the magnetic zone adjacent to the rail 98. This shoe is normally from two to three inches away from the rail, out of the magnetic zone and in a safe position.

The air also flows through the branch pipe 87a, past the valve 99, hereinafter described. It enters the cylinder 100 and actuates the piston 101 against the spring 102, thereby bringing the switch blade 103 across the terminals 104 and 105 connecting the lines 106 and 28. Likewise the switch blade 107 connects the terminals 108 and 109 on the lines 110 and 21 respectively. The lines 110 and 106 are connected to the energization coils 111 and 112 which are connected together by the wire 113.

The valve 99 shown in detail in Figure 8 consists of a casing 114 having a chamber 115 and an adjusting screw to control the rate of flow at 116. The bottom of the chamber is provided with a port 117 closed by the spring-pressed valve 118. This valve is provided with a stem 119 and is surrounded by a spring 120. The stem extends into the chamber 121, which has an exhaust port 122 controlled by the valve 123 on the bottom of the stem 119. The chamber 121 is also connected into the pipe 87a and leads to the cylinder 100.

By this arrangement, the air, first, is applied to the cylinder 94 to bring the brake shoe into application position, and then the air passes through the pipe 87a, beyond the valve 99, into the cylinder 100 to close the electric circuit and energize the brake.

Referring to Figure 2: This figure illustrates a system in which there is a common emergency air line 75 for a plurality of cars. The air can be decreased in this air line either by an automatic trip such as the trip 124 which is adapted to actuate the release valve 125, or by a conductor's valve 126 or by a manually operated motorman's valve, generally designated 127. 128 designates the air supply line and 129 the exhaust line in association with the motorman's control valve.

The push button switch 1 is also located adjacent to the motorman's station. The closing of the operator's push button circuit serves to energize the solenoid coils 91 to operate the valve members 84 on each car, as heretofore described.

In this arrangement, the generator 12 is located on the motorman's car and is connected in circuit as indicated. The particular detail connection is not of importance except that the single source of electrical energy on the motorman's car is connected by the lines 21 and 28 to all of the several cars for energizing the magnetic brakes.

In Fig. 2, the following electrical circuits are shown. We here state them by their names as found in this specification (page 4). The control circuits are composed of the lines or wires 5, 6, 9 and 10. Of these, lines 6 and 10 extend on beyond the installation shown in Figure 2, if and as required in erecting other installations. The line 9 starts from the generator 12, and the line 5 is switched in with the line 9 through the switch 9a.

One of the energizing circuits, 106 and 110, for energizing the rail brake, connects with the lines 5 and 9 through the switches 9a and 9b and thence to the terminals 104 and 105 through the switch 103 and the terminals 108 and 109 through the switch 107. This energizing circuit, consisting of the lines 106 and 110 then proceeds to the coils in the rail brake whereby it is magnetized. The other energizing circuit 106 and 110, at the right-hand in Figure 2, connects, respectively, with the control circuit lines 28 and 21 for the same purpose of energizing the adjacent rail brake 97.

The supply circuit consists of the lines 21 and 28 being, respectively, connected with the lines 110 and 106, and extend on beyond the installation shown in Figure 2, if and as required in erecting other installations.

The applying circuits are composed of the lines 92 and 93, which energize the solenoids 91 to actuate the valve stems 90 by which the valves 83 are adjusted to bring the recesses 85 into communication with the pipes 82 and 87, whereby the air in the tanks 81 is permitted to reach the pistons 94 to apply or position the rail brakes within the magnetic zone between them and the rails. It will be noted that lines 92 and 93, both at the left and at the right-hand portions of Figure 2 connect with the control circuit lines 6 and 10.

Referring to Figure 3: In the form shown in this figure as a modification, there is provided a source of electrical energy on each one of the cars adapted to independently magnetize the brake and to be brought within the magnetic zone adjacent to the rail or in engagement with the rail according to the setting of the apparatus. The brakes are brought to such a position by the reduction pressure in the emergency air line which permits the application of the supplementary sources of air of any character for the movement of the brake shoes into suitable positions and for the closing of the electrical energizing circuit, as heretofore described. The demagnetizing valve is entirely pneumatically operated. This valve is shown in detail in Figure 7. 130 indicates a piston working in the cylinder 131. The underside of the piston is supplied with air through the pipe 132. The space 133 so supplied communicates by a port 134 in the partition 135 with the space 136 in the cylinder 137, behind the piston 138 carried on the piston rod 139, which also serves as the piston rod for the piston 130. This cylinder 137 is provided with a port 140, which is sealed upon occasion by the piston 138, thereby preventing the exhaust of air from the cylinder 137. The piston 138 is likewise connected to the valve stem 54. The remainder of the dashpot apparatus is as heretofore described. Therefore, after the air has been applied for bringing the brake into application position, and the circuit has been closed for energizing the brake, the air will be released after a predetermined time, depending upon the setting of the dashpot mechanism. Upon the operation of the dashpot mechanism at a predetermined time, the air will be released through the port 140 and the parts under the influence of their associated springs will be de-energized and returned to their initial position.

In Figure 3 there are two essentially duplicate energizing circuits for energizing the rail brakes 97. From each generator 12 the line 9 and the switch 9a lead to the line 106, whence the current passes through the coils of the rail brakes and returns on the line 110, and across the terminals 104, 105, through the contact 106a; thence through 9b to the line 9c; thence to the generators 12.

Referring to Figure 4: In this mechanism, as so illustrated, there is the emergency air line performing as heretofore described in connection with Figure 3, and a straight line or automatic air controlled by a separate air controller 141. This line is provided with a supply pipe 142 which is connected by the pipe 143 to the supplementary air source for actuating the brake and the brake-energizing closing switch. This source is designated as 81. A separate receiver for such air may be mounted on each of the cars. The controller 141 is also connected by the air line 144 to each of the cars. Branches 145 from the air line 144 communicate with the space above the valve member 84. The space below the valve member 84 is supplied with air through the emergency branch 75a. This serves to keep this valve member 84 in an intermediate position, as indicated in Figure 4. Upon the applying of air pressure through the line 144 or upon a decrease of pressure in the line 75a, the valve member 84 descends under the influence of the spring 89 against the resistance of the spring 88, thereby putting the braking system into operation.

In Figure 4, the duplicate energizing circuits are the same as those described above in referring to Figure 3, and the same numerals are applied in respect to these energizing circuits in Figures 3 and 4.

Referring to the form in Figure 5, it will be noted that in this form there is a common emergency air line for all cars and an independent electrical energy source for brake energization for each car, an independent air source for brake application on each car and a common electrical control circuit operated by the push button 1 for controlling the application and energization of all the brakes from their independent electrical energy and air sources on each car.

Referring now to the control circuit shown in Figure 5, the generator 12 supplies current to the line 9c, which through the terminals 9d connects with the line 9f, when the push button 1 is pressed upon. The line 9f passes down and connects with the line 10 of the control circuit. The line 9j connects with the generator 12 which is connected when the push button has been operated with the line 9g through the terminals 9e; thence the line 9j connects with the line 6 of the control circuit. These control lines run across through the car represented in the right-hand portion of Fig. 5, if and as required in erecting other installations.

The line 92 takes current from the line 9j and energizes the solenoid 91 connected to the line 9f by the wire 93. Thus the solenoid is energized when needed. In the right-hand portion of Figure 5, which is in another car, the generator 12 supplies the line 9k, which through the switch 9i energizes the wire 106 which leads to one of the coils of the rail brake. The return wire 110 has a terminal 104 which through a switch 106b connects with the terminal 105 whence the current goes to a switch 9h and back to the generator through the line 9c. The line 110 connects with the other coil of the right-hand rail brake.

Referring now to the energizing circuit for energizing the brake shoe, it will be noted that the generator 12 supplies the line 9c, which a switch 9h leads to the terminal 105, which through the switch plate 106a connects with the terminal 104. The latter is mounted on the wire 110 which goes down and connects with one of the coils of the rail brake. The generator 12 also supplies the branch 9k with current which is transferred to the supply circuit line 106 by the switch 9i. Line 106 runs to the other coil of the rail brake.

Operation

When the operator desires to put the braking system into a position to be operated, he closes the switch 31. When he desires to operate the system, he then closes the push button 1 which closes the circuit 21—28 and actuates the valve member 84 with the result that the brake shoe 97 is brought into braking position, either adjacent to the rail or in engagement with it, and then energized. This energization continues until the dashpot valve mechanism in the chamber 56 operates, and upon the completion of operation, the circuit 21—28 is broken and the brake shoe is de-energized and returns to its initial position.

In the event of an emergency, by the operation of the conductor's valve or the automatic external trip 124 or the emergency controller 127, a decrease in air in the emergency line can be effected and the system will operate as heretofore described in connection with the valve 67 and switch 40.

The several electric lines mentioned in the next paragraph are shown in the preferred form of our invention illustrated in Fig. 1.

The lines 6 and 10 and the lines 5 and 9 connected by the push button switch 1 constitute what is known herein as the "control circuit". The electrical generator 12 with its bus lines 13 and 14, the prime mover 11 and the associated connections constitute the "source of electrical supply". The lines 21 and 28 constitute the "supply circuit". The lines 38 and 43 constitute the "cut-out circuit" for disrupting the connection between the source of electrical supply and the supply circuit. The lines 106 and 110 constitute the "energizing circuit". The lines 92 and 93 constitute the "applying circuit". It will be understood that any source of air or fluid pressure may be employed in the so-called air lines.

It will be understood that we desire to comprehend within our invention such modifications as may be necessary to adapt it to varying conditions and uses.

Having thus fully described our invention, what we claim as new and desire to secure by Letters Patent is:

1. In a magnetic brake system, a control circuit (as 6, 10), and applying circuit (as 92, 93) which is energized by said control circuit, a magnetic brake (as 97), means (as 94) for applying said brake, and pneumatic means (as 83 and 87) for pneumatically applying or positioning said brake, said pneumatic means being controlled by said applying circuit.

2. In a magnetic brake system, a supply circuit, an electrical source for said supply circuit, an energizing circuit, which is energized by said supply circuit, a magnetic brake, means (as 83, 87, 94) for applying or positioning the brake, means (as 103, 107) for closing the brake's energizing circuit; and means (as 56) to deenergize the energizing circuit by interrupting the connection (as 103, 107) between the supply circuit and the brake upon the lapse of a predetermined period of time.

3. In a magnetic brake system, a source of electrical energy, a supply circuit supplied thereby, a control circuit adapted to control the connection of the supply circuit to the source of supply, a magnetic brake, an energizing circuit adapted to be connected to the supply circuit, an applying circuit connected to the control circuit to control the application of the brake and the connection of the energizing circuit to the supply circuit whereby a closure of the control circuit will result in the application and energization of the brake.

4. In a magnetic brake system, a source of electrical energy, a supply circuit supplied thereby, a control circuit adapted to control the connection of the supply circuit to the source of supply, a magnetic brake, an energizing circuit adapted to be connected to the supply circuit, an applying circuit connected to the control circuit to control the application of the brake and the connection of the energizing circuit to the supply circuit whereby a closure of the control circuit will result in the application and energization of the brake, and a cut-out circuit for disrupting the connection between the supply circuit, the source of supply and the energizing circuit.

5. In a magnetic brake system, a source of electrical energy, a supply circuit supplied thereby, a control circuit adapted to control the connection of the supply circuit to the source of supply, a magnetic brake, an energizing circuit adapted to be connected to the supply circuit, an applying circuit connected to the control circuit to control the application of the brake and the connection of the energizing circuit to the supply circuit whereby a closure of the control circuit will result in the application and energization of the brake, a cut-out circuit for disrupting the connection between the supply circuit, the source of supply and the energizing circuit, and means for actuating the cut-out circuit upon the lapse of a predetermined time.

6. In a magnetic brake system, a magnetic brake, an energizing circuit therefor, a supply circuit, a source of electrical energy for supplying the supply circuit, a control circuit, and an air supply means for applying the magnetic brake and connecting the energizing circuit to the supply circuit, the application of which air means is controlled by said control circuit whereby upon the closing of the control circuit the brake will be moved into application position by the air and then the energizing circuit will be connected to the supply circuit and the brake energized and applied.

7. In a magnetic brake system, a magnetic brake, an energizing circuit therefor, a supply circuit, a source of electrical energy for supplying the supply circuit, a control circuit, an air supply means for applying the magnetic brake and connecting the energizing circuit to the supply circuit, the application of which air means is controlled by said control circuit whereby upon the closing of the control circuit the brake will be moved into application position by the air and then the energizing circuit will be connected to the supply circuit and the brake energized and applied, and means connected into the supply circuit for controlling the connection thereof to the source of electrical supply, said means being so arranged as to disconnect said electrical source of supply upon the lapse of a predetermined period of time.

8. In a magnetic brake system, a magnetic brake, an energizing circuit therefor, a supply circuit, a source of electrical energy for supplying the supply circuit, a control circuit, an air supply means for applying the magnetic brake and connecting the energizing circuit to the supply circuit, the application of which air means is controlled by said control circuit whereby upon the closing of the control circuit the brake will be moved into application position by the air and then the energizing circuit will be connected to the supply circuit and the brake energized and applied, means connected into the supply circuit for controlling the connection thereof to the source of electrical supply, said means being so arranged as to disconnect said electrical source of supply upon the lapse of a predetermined period of time, means for holding said last-mentioned means in circuit-closing position, and means connected to the control circuit for rendering inoperative said holding means.

9. In a magnetic brake system, a magnetic brake, air-operated means for applying the brake, and for connecting the brake to a source of electrical energy; an applying circuit for controlling the application of air to the air-operated means; an energizing circuit for energizing the brake, a supply circuit for connection with the energizing circuit, a control circuit connected to the applying circuit, means for closing the control circuit, a source of electrical energy adapted to be connected to the supply circuit upon the closing of the control circuit, a circuit for disconnecting the supply circuit from the source of electrical energy, an emergency air line, the pressure in which is adapted to maintain the last-mentioned circuit closed, and an electric circuit connected to the control circuit for disconnecting the air means which holds closed the circuit for connecting the supply circuit with its source of electrical energy.

10. In a magnetic brake system, a magnetic brake, air-operated means for applying the brake, and for connecting the brake to a source of electrical energy; an applying circuit for controlling the application of air to the air-operated means; an energizing circuit for energizing the brake, a supply circuit for connection with the energizing circuit, a control circuit connected to the applying circuit, means for closing the control circuit, a source of electrical energy adapted to be connected to the supply circuit upon the closing of the control circuit, a circuit for disconnecting the supply circuit from the source of electrical energy, an emergency air line, the pressure in which is adapted to maintain the last-mentioned circuit closed, an electric circuit connected to the control circuit for disconnecting the air means which holds closed the circuit for connecting the supply circuit with its source of electrical energy, and means associated with said last-mentioned circuit for automatically opening it and disconnecting the supply circuit from the source of electrical energy after a lapse of a predetermined period of time.

11. In a magnetic brake system, an emergency air line, an electrically-actuated valve for releasing air in the line, a cut-out circuit, means for maintaining said cut-out circuit closed by the pressure of the air passing through said valve from the emergency air line, a source of electrical supply, a supply circuit adapted to be disconnected from the source of electrical supply upon the opening of the cut-out circuit upon the decrease of air pressure in the emergency air line, a control circuit for connecting the source of electrical supply to the supply circuit, means for closing the control circuit, and a magnetic brake adapted to be applied by said control circuit and energized when so applied from the supply circuit whereby a decrease in the pressure in the emergency air line will bring about the application and energization of the magnetic brake.

12. In a magnetic brake system, a magnetic brake, means for energizing the brake, air-operated means for applying the brake, and connecting the energizing means to a source of electrical supply, a valve for controlling the application of the air to the brake, means for moving the valve to brake-operating position, an emergency air line the air pressure in which maintains said valve normally in inoperative position against said means, and means for decreasing the air pressure in the emergency air line, whereby said valve will direct air to the brake applying and brake energizing means, to thereby apply or position the brake with respect to the rail and energize the brake.

13. In a magnetic brake system, a magnetic brake means for energizing the brake, air-operated means for applying the brake and connecting the energizing means to a source of electrical supply, a valve for controlling the application of the air to the brake, means for moving the valve to brake-operating position, an emergency air line the air pressure in which maintains said valve normally in inoperative position against said means, whereby upon the decrease of pressure in the emergency air line the valve will connect the air to the brake to apply it and energize it, means connected to the emergency air line for controlling the closure of a cut-out circuit, and a cut-out circuit for controlling the connection of the electrical source of supply to the energizing circuit.

14. In a magnetic brake system, a magnetic brake means for energizing the brake, air-operated means for applying the brake and connecting the energizing means to a source of electrical supply, a valve for controlling the application of the air to the brake, means for moving the valve to brake-operating position, an emergency air line the air pressure in which maintains said valve normally in inoperative position against said means, whereby upon the decrease of pressure in the emergency air line the valve will connect the air to the brake to apply it and energize it, means connected to the emergency air line for controlling the closure of a cut-out circuit, a cut-out circuit for controlling the connection of the electrical source of supply to the energizing circuit, and means upon the decrease of the pressure in the emergency air line for disrupting said cut-out circuit upon the lapse of a predetermined period of time.

15. In a magnetic brake system, a control circuit, means for closing the circuit, a supply circuit, a source of electrical supply adapted to be connected to the supply circuit by closing the control circuit, a brake-applying circuit, a fluid pressure valve controlled thereby, supplementary fluid pressure means for maintaining said valve in inoperative position until the fluid pressure decreases or the applying circuit is energized, means controlled by said valve for applying said brake by fluid pressure and closing the energizing circuit for energizing the brake, and an energizing circuit adapted to be connected to the supply circuit, whereby upon the decrease in pressure of fluid pressure as described or the closing of the control circuit the brake will be applied and energized.

16. In a magnetic brake system, a control circuit, means for closing the circuit, a supply circuit, a source of electrical supply adapted to be connected to the supply circuit by closing the control circuit, a brake-applying circuit, a fluid pressure valve controlled thereby, supplementary fluid pressure means for maintaining said valve in inoperative position until the fluid pressure decreases or the applying circuit is energized, means controlled by said valve for applying said brake by fluid pressure and closing the energizing circuit for energizing the brake, an energizing circuit adapted to be connected to the supply circuit, whereby upon the decrease of the air pressure the brake will be applied and energized, a cut-out circuit for disconnecting the supply circuit and source of electrical supply, and a delay action switch therefor.

17. In a magnetic brake system, a control circuit, means for closing the circuit, a supply circuit, a source of electrical supply adapted to be connected to the supply circuit by closing the control circuit, a brake-applying circuit, a fluid pressure valve controlled thereby, supplementary fluid pressure means for maintaining said valve in inoperative position until the fluid pressure decreases or the applying circuit is energized, means controlled by said valve for applying said brake by fluid pressure and closing the energizing circuit for energizing the brake, an energizing circuit adapted to be connected to the supply circuit, whereby upon the decrease of the air pressure the brake will be applied and energized, a cut-out circuit for disconnecting the supply circuit and source of electrical supply, a delay action switch therefor, means connected with the above mentioned second fluid pressure system for actuating said delay action switch, and means connected with the control circuit for electrically controlling the application of the fluid pressure therefor.

18. In a system of magnetic brake application, the combination of the following: a control circuit and a supply circuit, both circuits connected to a source of electrical supply; a magnetic brake; a source of electrical energy to magnetize said brake; means for applying fluid pressure to connect said magnetic brake with said source of electrical energy, for energizing said brake to draw it into braking engagement with a track rail.

19. In combination, an emergency air system, magnetic brakes, means of energizing said brakes, means upon a decrease in pressure in said air system of applying said brakes and connecting them for energization to the source of electrical supply, a supply circuit, and means controlled by the pressure in said air system for maintaining a connection between the source of electrical supply and the supply circuit for energizing the brakes.

20. In combination in a magnetic brake system, an emergency air line, an air application valve normally maintained in neutral position by the pressure in said air line, a source of air pressure controlled by said valve for applying magnetic brakes and connecting them to a source of energization, an electrical supply circuit therefor, and an electrical supply connected thereto whereby upon a decrease of pressure in the first-mentioned air line the brakes will be applied and energized.

21. In combination in a magnetic brake system, an emergency air line, an air application valve normally maintained in neutral position by the pressure in said air line, a source of air pressure controlled by said valve for applying magnetic brakes and connecting them to a source of energization, an electrical supply circuit therefor, an electrical supply connected thereto whereby upon a decrease of pressure in the first-mentioned air line the brakes will be applied and energized, and means to disrupt the connection between the electrical supply and the supply circuit maintained normally closed by the air pressure in the first-mentioned air supply line and arranged upon the decrease of pressure therein to open after a lapse of a predetermined period of time.

22. In combination, means for supplying air for operating rail-brakes on each of several cars; electrical means for energizing said rail-brakes on each of the several cars; a common electrical control circuit; an applying circuit controlled thereby, the applying circuit to energize said magnetic rail brakes on each of said cars at a point remote from at least some of them, and air means controlled by the applying circuit and adapted to position the rail brakes within the magnetic field between the brakes and the rail.

23. In combination, in a magnetic brake system of a balanced control valve for controlling the application of air to position a magnetic brake and connected with the source of electrical energy, means comprising an emergency air system adapted to normally maintain said valve in inoperative neutral position, and means adapted to move said valve into operative position upon a decrease of pressure in the emergency air system.

24. In combination, in a magnetic brake system of a balanced control valve for controlling the application of air to position a magnetic brake and connected with the source of electrical energy, means comprising an emergency air system adapted to normally maintain said valve in inoperative neutral position, means adapted to move said valve into operative position upon a decrease of pressure in the emergency air system, and means to manually control the energization of an electrical circuit for energization of magnetic brakes controlled by said air.

25. In combination, in a magnetic brake system, magnetic brakes, means for electrically energizing said brakes, air pressure means for applying said brakes and connecting them to the source of electrical energy, and a delay-action-valve pneumatically actuated and connected with said air-actuating means to cut off said air so as to withdraw said brakes and de-energize them after the lapse of a predetermined period of time.

26. In combination, an emergency air system, a balanced air control valve connected on one side to the emergency air system, means for maintaining said valve in neutral position when the emergency air system has a predetermined air pressure therein, and an air supply system for applying and connecting magnetic brakes so as to energize them, said air supply being controlled by said valve whereby when the air pressure in the emergency line decreases the valve will be opened and the brakes applied and energized.

27. In combination, an emergency air system, a balanced air control valve connected on one side to the emergency air system, means for maintaining said valve in neutral position when the emergency air system has a predetermined air pressure therein, an air supply system for applying and connecting magnetic brakes so as to energize them, said air supply being controlled by said valve whereby when the air pressure in the emergency line decreases the valve will be opened and the brakes applied and energized, and pneumatically-operated means for deenergizing said brakes after a predetermined lapse of time.

28. In a magnetic brake system, a supply circuit (as 21, 28), a source of electrical supply (as 12) for said supply circuit, an energizing circuit (as 110, 106) which is electrically supplied by said supply circuit, a control circuit (as 6, 10), an applying circuit (as 92, 93) which is energized by said control circuit, a magnetic brake (as 97), means (as 94) for applying said brake, and pneumatic means (as 83, 87) for pneumatically applying or positioning said brake, said pneumatic means being controlled by said applying circuit.

THEODORE H. SCHOEPF.
DAVID M. RITCHIE.